Patented Dec. 31, 1940

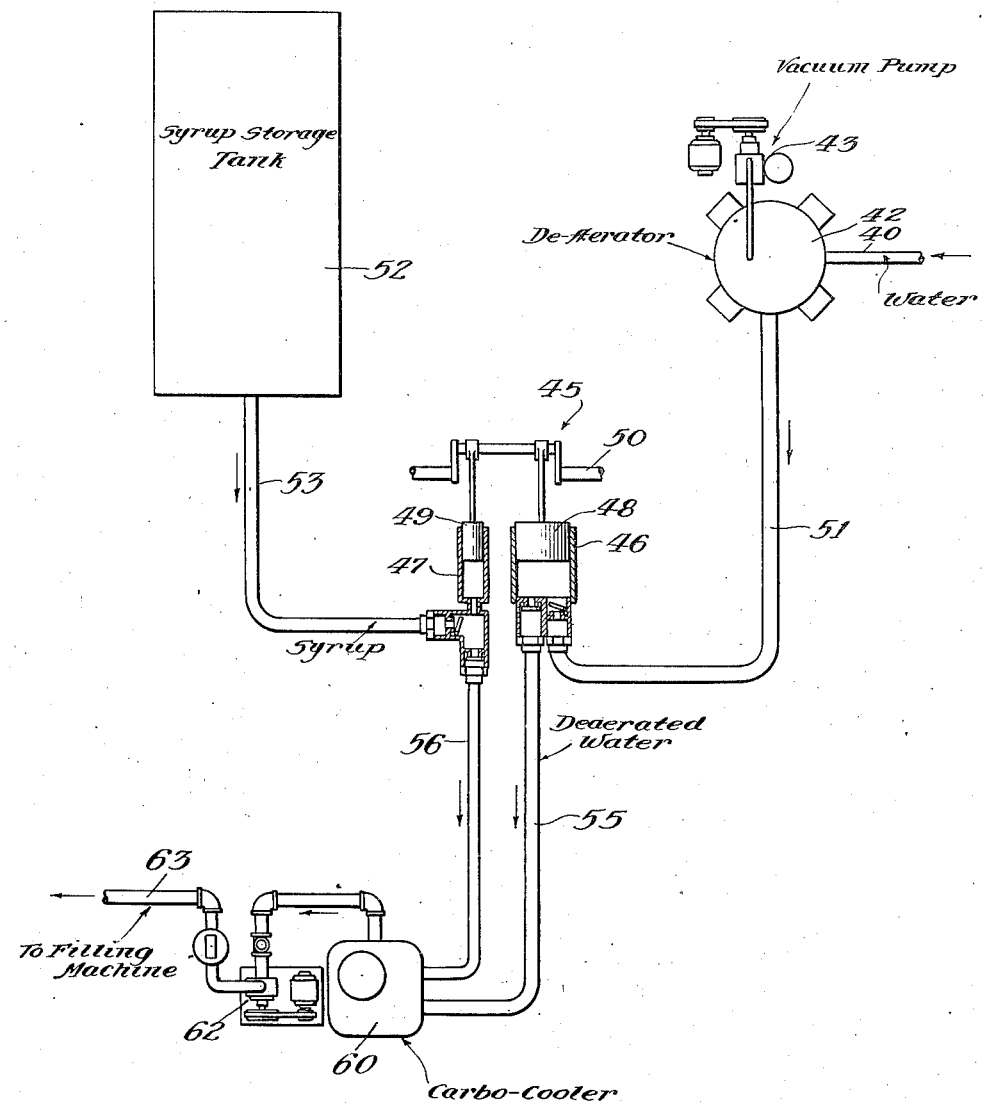

2,227,101

UNITED STATES PATENT OFFICE 2,227,101

METHOD OF PREPARING CARBONATED BEVERAGES

George L. N. Meyer, Milwaukee, Wis.

Application August 12, 1939, Serial No. 289,926

11 Claims. (Cl. 99—79)

This invention relates to a method of preparing carbonated beverages for bottling.

According to the way carbonated beverages have heretofore been prepared, a predetermined quantity of syrup or other flavoring matter has been distributed into bottles and carbonated water under counter-pressure then introduced into the bottles on top of the syrup after which the pressure in the bottles was reduced to atmospheric and the bottles then capped or sealed. After sealing, the bottles were rotated or shaken to agitate and mix the syrup and the carbonated water. The syruping, filling with carbonated water, capping and agitating were each done on separate machines.

Since the individual bottles varied slightly in size and shape, and, as the syruper supplied a definite quantity of syrup, and the water filling machine usually filled the bottles to a definite level, it was almost impossible to insure absolute uniformity of the beverage.

In introducing the carbonated water into the bottles, great care had to be exercised to prevent its mixing with the syrup prior to capping, as any mixing of the two, prior to capping, would cause the beverage to foam and overflow the neck of the bottles when exposed to atmospheric pressure.

The care required to prevent the mixing of the syrup and carbonated water, prior to capping the bottles, has necessitated a slow rate of water flow into the bottles, thus reducing valve capacity. In order to obtain a high bottle output it is therefore necessary to have larger and more expensive filling machinery than would be required if the full valve capacity could be used in filling the bottles.

Where attempts have been made to pre-mix the syrup and water prior to bottling, the syrup was mixed in a tank with an uncarbonated water. The mixture was then carbonated by a candle or stone for a long period of time during which carbon dioxide ($CO_2$) gas was allowed to escape and bubble through the mixture, thus working out the air dissolved in the water. The mixture of syrup and uncarbonated water causes the growth of bacteria with consequent flavor changes because of dilution of the syrup. Also, the bubbling of the air and carbon dioxide through the mixture removes volatile oils and esters and results in an inferior product.

One object of the present invention is to provide a method by which carbonated beverages may be prepared in bulk without loss of volatile oils or esters and then bottled.

A further object is to provide a method by which excessive foaming will be obviated when bottling the mixed ingredients of a carbonated beverage.

A further object of the present invention is to provide a method by means of which the apparatus employed to bottle carbonated beverages will be simplified.

A further object is to provide a method which will eliminate expensive machinery now necessary to bottle carbonated beverages.

A further object is to provide a method of bottling carbonated beverages which will produce a more uniform product.

A further object is to provide a method of bottling carbonated beverages which will increase the speed of filling the bottles.

A further object is to provide a method of bottling carbonated beverages which will increase the plant production.

Other objects will become apparent from the following description.

According to the present invention, the beverage is prepared by mixing a deaerated water with a flavoring syrup, the water being carbonated either before or after mixing with the syrup and the resulting beverage then bottled.

In the drawings:

Fig. 5 is a modification of the invention showing a second apparatus capable of carrying out the principles thereof.

It is a well known fact that air is very slightly soluble in water, and any air which may be dissolved in water is easily driven off.

It has been found that air in solution in the water used in a carbonated beverage is responsible for both foaming where the syrup is mixed with a carbonated water, and for flavor changes and loss of volatile oils and esters where the syrup is mixed with an uncarbonated water and subsequently carbonated.

When syrup is mixed with a carbonated water the foaming which occurs has been found to be due to the air leaving the solution and carrying with it quantities of carbon dioxide ($CO_2$) gas. The tendency to foam is greater if the sugar is thoroughly dispersed as it drives out air particularly when the beverage is in a super-saturated state as to carbon dioxide. If the gases dissolved in the water including both carbon dioxide and air are properly correlated in the beverage it will have little if any tendency to foam. With normal amounts of carbon dioxide, that is, from 3 to 5 volumes of gas, the amount of air permissible varies from about 3 to about 8 cc. per litre depending upon the nature of the syrup.

When mixing uncarbonated water with the syrup the changes in flavor which result have been found to be due to air in solution which promotes the growth of bacteria causing the flavor change. Even very small quantities of air have a serious effect on the quality of the beverage. In addition to the loss of flavor the beverage looses esters and volatile oils when the syrup and water are carbonated together due to the fact that air is then driven out of solution carrying with it large quantities of carbon dioxide gas. The gas bubbling through the beverage carries with it volatile oils and esters which further decrease the quality of the beverage.

It has been found that the syrup can be mixed safely with water in the presence of carbon dioxide gas as bacteria cannot grow when carbon dioxide gas is present. If the quantity of air in solution is kept within the limits stated above no serious foaming or discharge of gas will result and therefore there will be no losses of esters or volatile oils.

Figure 1:
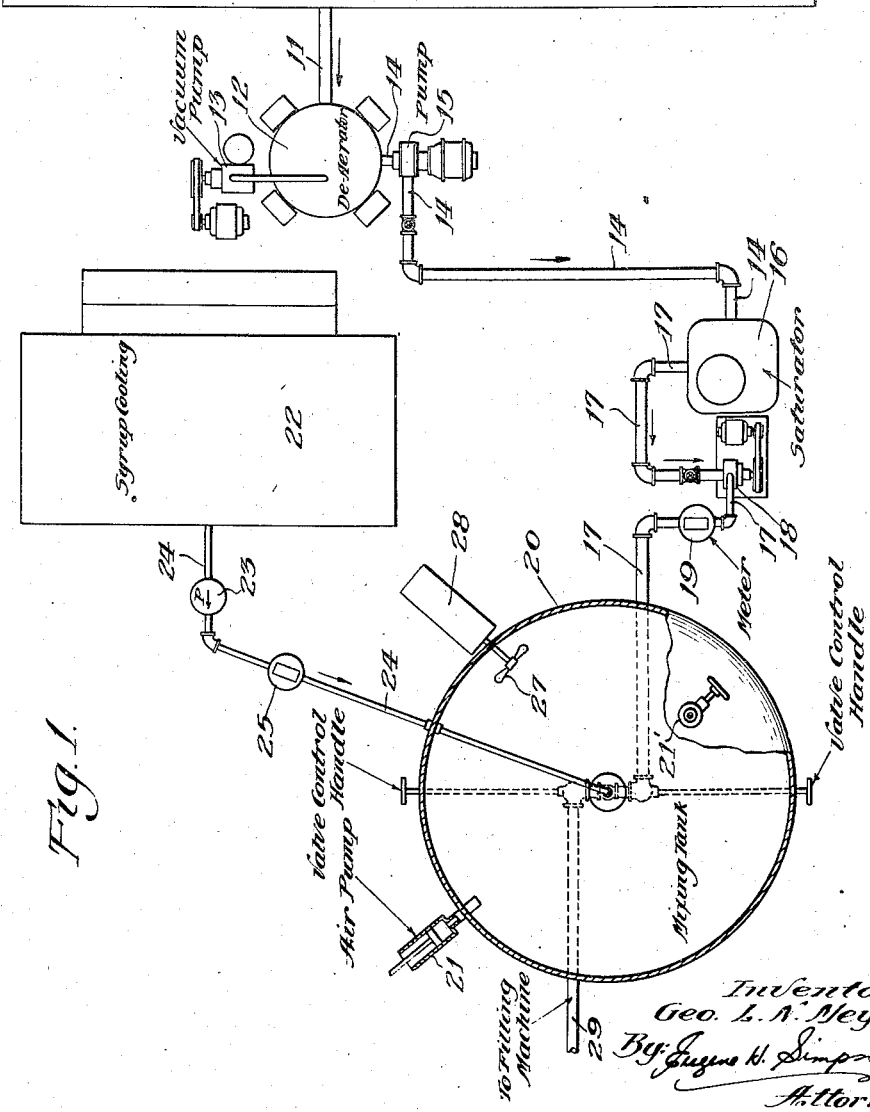
Fig. 1 is a diagrammatic view of one apparatus capable of carrying out the present invention.
Figure 2:
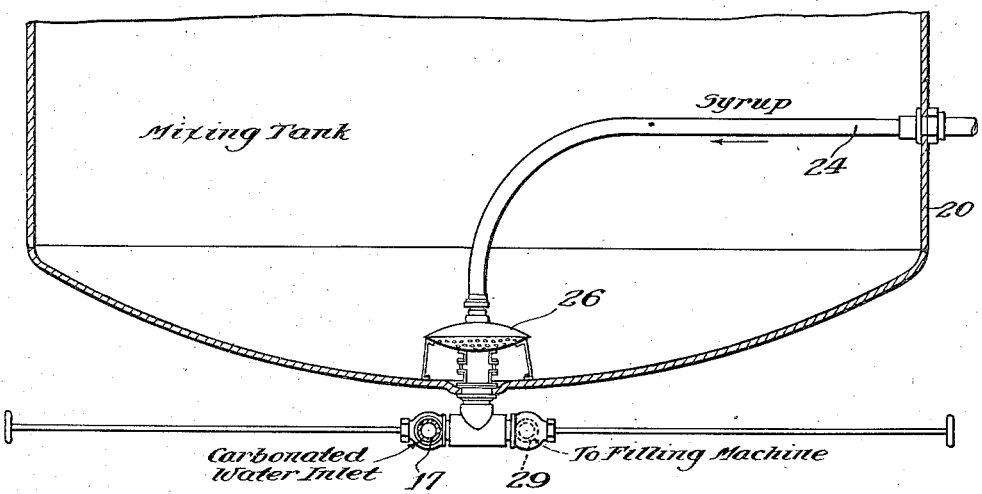
Fig. 2 is a cross-section of the lower portion of the mixing tank shown in Fig. 1.
Figure 3:
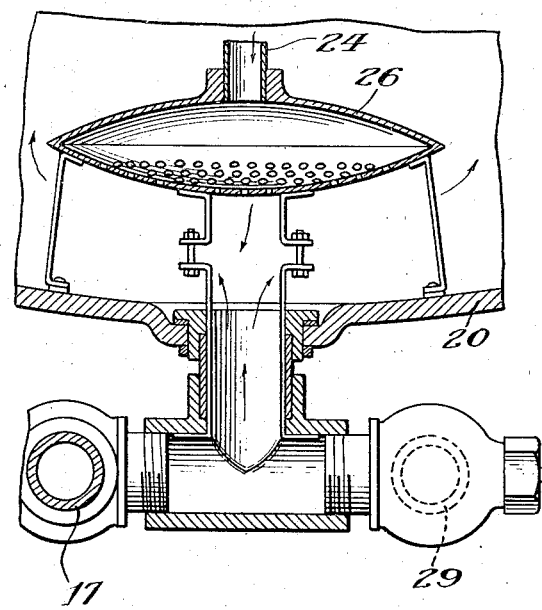
Fig. 3 is an enlarged cross-section through the bottom of the mixing tank and through the discharge head for the syrup.

In accordance with these principles which have been discovered two modifications of the invention are shown in Figs. 1 to 3 inclusive and in Fig. 5. Figs. 1 to 3 inclusive show an apparatus to mix a carbonated water with a flavoring syrup prior to bottling while Fig. 5 shows an apparatus to carbonate water and syrup during mixing.

Referring to Figs. 1 to 3 inclusive filtered water is brought into a cooling tank 10 where its temperature is reduced to a point just above freezing. The water leaves the cooling tank 10 through a pipe 11 and enters a deaerator 12, which is maintained under a high vacuum by a vacuum pump 13 and withdraws any air in the water. The deaerator is designed to have a large surface of water exposed so that the air contents of the water is reduced from a maximum of about 30 c. c. to about 3 c. c. per litre.

The deaerated water is drawn out of the deaerator 12 through a pipe 14 by means of a pump 15, and delivered to a carbonator 16. From the carbonator which has charged the water with the desired quantity of carbon dioxide gas, the water is drawn off through a pipe 17 by means of a pump 18, which raises the pressure on the water and delivers it through a meter 19 in the pipe 17 and into a mixing tank 20.

The tank 20 is maintained under pressure by an air pump 21 which pumps air into the tank 20 prior to filling with the beverage. A pressure relief valve 21' in the upper part of the tank 20 permits the escape of air as the tank is filled to maintain the pressure in the tank constant, and is manually operable to allow the pressure to be decreased to atmospheric.

The syrup is stored in a tank 22 which contains a cooling element to cool and maintain the syrup at a temperature approximately that of the water.

As the water enters the tank 20, the syrup is pumped by a pump 23 through a pipe 24 and a meter 25, and enters the tank 20 through a delivery head 26, best shown in Figs. 2 and 3. The delivery head 26 comprises a spray at the end of the syrup inlet pipe 24 which directs the syrup in a plurality of fine streams into the incoming carbonated water with the direction of flow of the syrup being directly opposed to the water, so that thorough mixing occurs.

An agitator 27 which may comprise a screw propeller driven by a motor 28 is mounted in the mixing tank 20. When the liquid level in the tank 20 rises above the top of the propeller the motor 28 is started which revolves the propeller slowly and completes the mixing of the syrup and water. When the required amounts of syrup and carbonated water are in the tank 20 both the pumps 18 and 23 and the agitator 27 are stopped and the beverage is ready to be drawn off through a pipe 29 and delivered to a filling machine preparatory to bottling.

Figure 4:
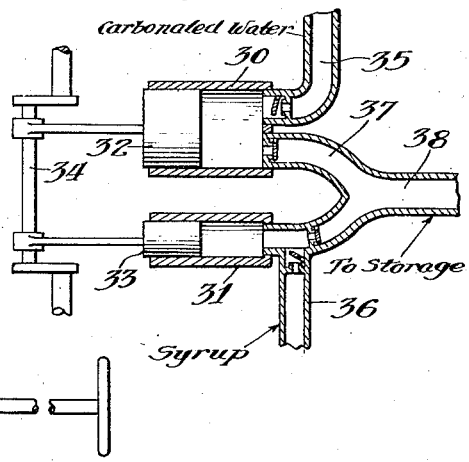
Fig. 4 is a modification of the invention showing a second method of effecting a mixing of syrup and carbonated water.

An alternate apparatus for proportioning and mixing the carbonated water and syrup is shown in Fig. 4. This figure shows a proportioning pump comprising cylinders 30 and 31 so proportioned in diameter as to give the required volumes of carbonated water and syrup on each stroke of plungers 32 and 33, respectively. Both plungers operate off the same crank shaft 34 so that the stroke of the pistons and their velocity is always identical. In this form of the invention deaerated carbonated water is drawn from the carbonator 16 through an inlet pipe 35 at the same time that syrup is drawn from the syrup tank 22 through a pipe 36. Both the syrup and carbonated water are discharged simultaneously through a Y connection 37 into a feed pipe 38 leading to the filling machines (not shown).

Fig. 5 shows a second apparatus capable of accomplishing the present invention. Referring to that figure, water is delivered through a pipe 40 to a deaerator 42 similar to the deaerator 12 of Fig. 1. A vacuum pump 43 maintains a high vacuum within the deaerator so that the air content of the water is reduced to about 3 cc. per litre.

A proportioning pump, generally designated 45, comprises a pair of cylinders 46 and 47 having pistons 48 and 49 operable therein from a common crank shaft 50. On the suction stroke of the pump 45 the deaerated water is drawn out of the deaerator 42 through a pipe 51 into the cylinder 46 and at the same time syrup is drawn from a syrup storage tank 52 through a pipe 53 into the cylinder 47.

On the discharge stroke of the pump 45, the water and syrup drawn in on the suction stroke, are forced through pipes 55 and 56 respectively, and into a carbo-cooler 60, where they are mixed in the presence of carbon dioxide gas. The areas of the pistons 48 and 49 are proportional to the desired quantities of water and syrup in the finished beverage, and therefore the quantities of water and syrup are always in the same ratio, and a uniform beverage results.

The carbo-cooler 60 is constructed of a plurality of cooling coils over which the water and syrup pass and are cooled. At the same time that the mixture is being cooled it is absorbing carbon dioxide gas which is maintained under pressure in the carbo-cooler. After the mixture has absorbed the desired amount of carbon dioxide gas, it is withdrawn from the carbo-cooler 60 by a pump 62, and delivered through a pipe 63 to a filling machine (not shown) for delivery into suitable containers.

*Operation*

In the operation of the apparatus shown in Figs. 1, 2 and 3, a filtered water is supplied to the cooling tank 10 where it is cooled to approximately 34° Fahrenheit.

When the water has reached the proper temperature it is delivered through the pipe 11 to the deaerator 12. The deaerator 12 exposes a large surface of water and is maintained under a vacuum of about 29 inches of mercury by the vacuum pump 13 so as to reduce the air contents of the water to approximately 3 cc. per litre.

The pump 15 withdraws the deaerated water through the pipe 14 and delivers it under pressure to the carbonator 16. The carbonator 16 impregnates the deaerated water with carbonic acid gas ($CO_2$) until the water has absorbed the desired quantity, usually from 3 to 5 volumes depending upon the $CO_2$ pressure and water temperature, and delivers the carbonated water to the pump 18, which raises the pressure from 20 to about 35 pounds per square inch.

The water upon leaving the pump 18 passes through the meter 19, which is preferably of the type adapted to deliver a predetermined quantity of liquid and then automatically shut off the supply.

The carbonated water then flows through the pipe 17 and into the mixing tank 20 which is maintained under a constant pressure approximately the same as the carbonator by the air pump 21. The syrup which has been cooled to a temperature as low as or lower than that of the water and properly rested to reduce its air content to a minimum is pumped by the pump 23 through the pipe 24, metered by the automatic meter 25, and delivered to the mixing tank 20 through the delivery head 26, described above, where it mixes with the entering carbonated water. The meter 25 is designed to shut off the flow of syrup when a predetermined quantity has entered the tank 20. The beverage thus formed is mixed by the agitator 27 during the filling of the tank so that when the tank is full the syrup and carbonated water are thoroughly blended. The finished product may be drawn off and delivered to the filling machines (not shown) which supply the beverage to the containers.

It will be noted that the beverage in the tank is in an under-saturated condition as to $CO_2$, and that by the proper control of temperature and pressure within the tank 20 this condition can be varied at will to give greater or lesser percentage of saturation.

In order to further guard against an excess of air in the syrup and insure against foaming it is sometimes desirable to first blow off the pressure in the tank 20 and reduce the pressure to atmospheric. As the pressure approaches atmospheric the condition of the gas in solution changes from under-saturated to super-saturated and if excess air is present some of the $CO_2$ will come out of solution and wash out the air leaving a beverage free of air which will not foam when put in bottles. Pressure is then re-applied in the tank 20 and the beverage supplied to the filling machine for delivery to the bottles.

If carbon dioxide gas is available in large quantities, the deaeration may be accomplished by allowing $CO_2$ to bubble through the water. The $CO_2$ bubbling through the water carries with it the air, in solution, thus performing the function of the deaerator 12.

In the form of the invention shown in Fig. 5 the cooling, carbonating and mixing are done in the carbo-cooler, and the finished beverage supplied directly to the filling machines for delivery to containers.

Having thus described the invention, it will be realized that it is susceptible to various changes and modifications, and it is therefore not desired to limit the invention to the precise forms herein shown and described but only by the scope of the appended claims.

Having thus described the invention, it is hereby claimed as follows:

1. A method of preparing a carbonated beverage comprising, deaerating a cool water and mixing the deaerated water with a cool flavoring syrup and carbonating prior to bottling.

2. A method of preparing a carbonated beverage comprising, deaerating a water, mixing the deaerated water with a syrup, carbonating the resultant mixture and cooling the mixture preparatory to bottling.

3. A method of preparing a carbonated beverage comprising, deaerating a water, cooling a syrup, cooling the water and mixing the deaerated water with the syrup and carbonating preparatory to bottling.

4. A method of preparing a carbonated beverage comprising, deaerating a water, mixing the deaerated water with a flavoring syrup and carbonating the mixture preparatory to bottling.

5. The method of preparing carbonated beverages comprising, carbonating a deaerated water and mixing the carbonated water with a flavoring syrup preparatory to bottling.

6. The method of preparing carbonated beverages comprising, deaerating a water until the air content is less than 8 cc. per litre, carbonating the deaerated water and mixing the carbonated water with a predetermined quantity of flavoring syrup preparatory to bottling.

7. The method of preparing carbonated beverages comprising, cooling a quantity of water, deaerating the cooled water until the air content is less than 8 cc. per litre, carbonating the deaerated water, mixing the carbonated water under pressure with a syrup, bringing the mixture to a state where it is super-saturated with $CO_2$ and reducing the mixture to an under-saturated condition preparatory to bottling.

8. The method of preparing carbonated beverages comprising, carbonating a predetermined quantity of deaerated water, delivering the carbonated water at an increased pressure to a mixing tank, supplying a predetermined quantity of flavoring syrup to the mixing tank and blending the syrup with the water preparatory to bottling.

9. The method of preparing carbonated beverages comprising, carbonating a predetermined quantity of water containing not more than 8 cc. of air in solution per litre of water, delivering the carbonated water at an increased pressure to a mixing tank, supplying a predetermined quantity of flavoring syrup to the mixing tank and blending the syrup with the water preparatory to bottling.

10. A method of preparing a carbonated beverage comprising, deaerating a water, and simultaneously mixing a syrup with the deaerated water and carbonating the mixture.

11. A method of preparing a carbonated beverage comprising, deaerating a water and mixing a syrup with said deaerated water, and simultaneously cooling and carbonating the mixture.

GEORGE L. N. MEYER.